May 30, 1967     P. DESTIVAL     3,322,474

SHOCK ABSORBING BEARING STRUCTURE

Filed Oct. 30, 1964

INVENTOR.
Pierre Destival
BY
Pierre, Scheffler & Parker
attorneys

United States Patent Office 3,322,474
Patented May 30, 1967

3,322,474
SHOCK ABSORBING BEARING STRUCTURE
Pierre Destival, Paris, France, assignor to Cie Electro-Mecanique, Paris, France, a corporation of France
Filed Oct. 30, 1964, Ser. No. 407,776
Claims priority, application France, Nov. 14, 1963, 953,734, Patent 1,380,813
4 Claims. (Cl. 308—26)

The present invention relates to shaft bearings and more particularly to bearings of the shock-absorbing type.

In the case of bearings for high-speed rotary machines such as steam or gas turbines, it very often happens that the normal operating speed of the machine exceeds the first, and sometimes even the second, critical speed of the shaft which results in the production of vibrations in the bearings. These vibrations become more violent as the residual unbalance of the rotor due to imperfect equilibrium becomes greater.

It is therefore most desirable that the amplitudes of these vibrations be limited by effective shock-absorbing devices when the critical speeds of the rotor shaft are exceeded.

Shock-absorbing devices are known which damp the vibrations and are used principally in roller bearings. These devices create artifically a shock-absorption by interposing between the bearing roller and its housing plate packs in the form of several superposed concentric layers composed of rings, or half-rings, with thin oil films interposed therebetween which produce the shock-absorbing effect. Holes provided in the plates facilitate penetration of oil between them, and the plate pack is preferably locked in a bush rigidly mounted in the bearing. The principal disadvantage of this type of shock-absorbing device is that the weight of the shaft must be supported by and hence stress the plate packs, which is hardly practical for large and heavy machines.

Another device, in accordance with French Patent No. 1,133,779, and which permits one to exceed critical shaft speeds, establishes an additional elasticity for the bearing by use of an elastic support structure comprising three half-rings arranged between the bearing and its support, the center one of the half-rings being connected to the two outer half-rings by a series of parallel elastic bars. Either the outer half-rings lie in contact with the bearing and the center half-ring in contact with the support for the bearing, or vice versa. This device permits the machine to rotate above a critical shaft speed but it is not capable of absorbing vibrations.

An object of the present invention is therefore to provide an improved construction for a shock-absorbing bearing which is simple and yet rugged, and which can be accommodated in a space generally reserved for a normal bearing, the bearing permitting the shaft to exceed a critical speed while absorbing the shaft vibrations.

A more particular object is to provide a shock-absorbing bearing which comprises an elastic shaft bush spring composed of at least three half-rings united by elastic bars, wherein at least one of the half-rings supporting the bush bears downwardly upon a shock-absorbing element inserted without stress between the body of the bearing and bush, this shock absorbing element serving to absorb and damp displacements of the bush due to vibrations of the shaft, and wherein the weight of the shaft is not carried by the shock-absorbing element but rather is entirely supported by the remaining half-ring(s) of the elastic bush spring which rest directly upon the body of the bearing.

Another object is to provide an improved shock-absorbing bearing of the type described in the preceding paragraph and wherein the shock-absorbing element is constituted by a pack of thin perforated plates, curved concentrically to the bush in the form of rings open at the unjoined edges and provided with half-rims which serve to establish a uniform distribution of the pressure over the plates. One of these half-rims is inserted between the lower part of the plates and the one or more half-rings which support the bush, and the other half-rim is inserted between the upper part of the plates and the corresponding upper part of the bush. The stack of shock-absorbing plates can operate with oil films therebetween to absorb shocks due to the oil viscosity, or without oil in which case shock absorption is due to sliding friction between adjacent plates.

The foregoing as well as other objects and advantages inherent in the invention will become more apparent from the following detailed description of a non-limiting embodiment and from the accompanying drawings wherein.

Figure 1:
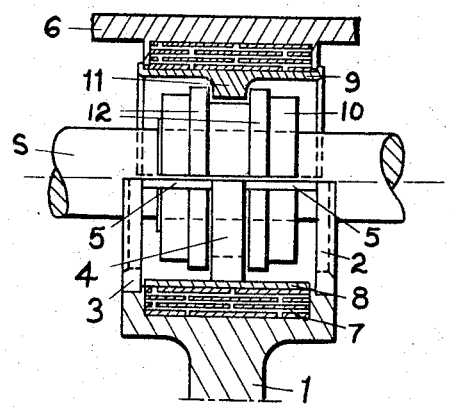
FIG. 1 is a view in longitudinal vertical section of a shock-absorbing bearing showing the elastic shaft support and bearing bush in place on the bearing body.
Figure 2:
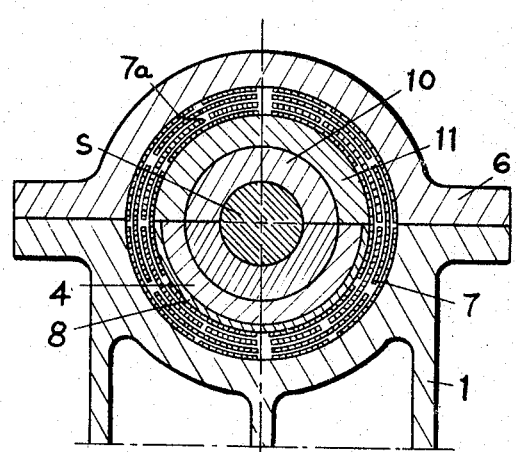
FIG. 2 is a view in transverse vertical section through the center of the bush.
Figure 3:
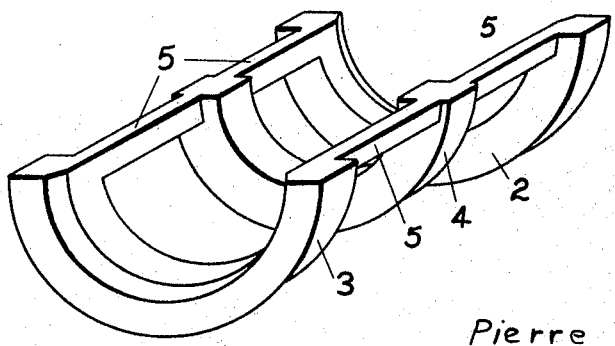
FIG. 3 is a perspective view of the elastic support for the shaft bush.

With reference now to the drawings, the lower semi-cylindrical half of the bearing body is indicated at 1. The elastic shaft bush support shown in FIG. 3 is seen to be comprised of two outer half-rings 2 and 3 and a center half-ring 4 which is structurally united with the outer half-rings by means of elastic bars 5 which establish the desired elasticity under the action of the weight of the shaft S passing through the bush. The number of elastic bars 5 will of course vary in accordance with the amount of the shaft weight to be supported. In the lower limiting case, such as represented in FIG. 3, it can be reduced to two for each outer half-ring. The elastic support described is disclosed in the aforesaid French Patent No. 1,133,779 and the outer half-rings 2 and 3 rest directly upon opposite ends of the bearing body 1 as depicted in FIG. 1.

Introduced between the lower bearing body 1 and the semi-cylindrical bearing cap 6 is a pack of concentric, thin shock-absorbing plates 7. These plates are curved concentric to the bush 10 through which the shaft S passes and have the form of rings, open on one side with the edges not joined. The ring-shaped plates 7 are provided with a plurality of holes 7a to permit passage of oil therebetween, and it will be noted that the holes in one plates are staggered with respect to the holes in an adjacent plate.

Two half-rims 8 and 9 are interposed between the ring-shaped plates 7 and bush 10 which latter is seen to be constituted by semi-cylindrical halves with a joint therebetween in a horizontal plane. The lower half-rim 8 in the form of a semi-cylindrical plate is located beneath the central half-ring 4 of the elastic support, and the upper half-rim 9 comprises an outer semi-cylindrical surface and an inner surface provided with a centrally located rib 11 which is seated between two axially spaced collars 12 on the bush 10. The half-rims 8 and 9 serve to uniformly distribute the pressure over the shock absorbing plates 7.

The housing of the plates 7 in the bearing is preferably terminated by two concentric cylindrical surfaces whose axis coincides with the axis of the bush in the position it occupies when it supports the weight of the bush.

The construction in accordance with the invention permits one to obtain a uniform shock-absorbing effect in all radial directions. It also permits one to regulate tightening of the plates 7 without changing the position of the bush axis. Thanks to this arrangement, the plates 7 do not support the weight of the shaft S. The shaft weight is transmitted by bush 10 to the half-ring 4 of the elastic support and half-ring 4 in turn transmits the weight by way of the elastic bars 5 to the two outer half-rings 2 and 3 which rest directly upon the bearing body as shown in FIG. 1.

The shock-absorbing bearing according to the invention is assembled in the following manner. First, the position of the axis of the bush under load, i.e. under the weight of the shaft when at rest, is marked. To this end, the shaft is mounted on its bearings including their elastic bush supports, but without introduction of the shock-absorbing plates 7 and of the half-rims 8 and 9. Then the whole is disassembled and a bore is provided in the bearing body 1 and its cap 6 concentrically to the position of the axis previously assumed, taking into account the space occupied by plates 7 and of the half-rims 8 and 9. The bearing is then completely reassembled with the plates 7 and half-rims 8, 9. By proceeding in this manner, one can make certain that the weight of the shaft is exerted only upon the elastic support, the position of the bush depending only upon the flexure of the bars 5.

Regulation of the shock absorption is effected in dependence on the number, thickness and width of the plates 7 interposed between the two concentric surfaces formed by the bore of the bearing and of the half-rims 8 and 9.

The shock-absorbing effect during vibrations of the shaft can be obtained with the shock-absorbing plates 7 operating in oil as well as for dry operation. When oil is used, shock absorption is attributable to the viscosity of the oil. When the plates are operated dry, the shock absorption is attributable to friction between the plates which, due to expansion, rub on each other only at certain points.

The shock-absorbing bearing according to the invention can thus be used both with oil bushes and with gas bushes.

In the embodiment of the invention which has been described, the bush 10 is supported directly by the center half-ring 4. Without departing from the spirit of the invention, one can so arrange the elastic support, as explained in the aforesaid French Patent No. 1,133,779 that the bush 10 will rest directly upon the two outer half-rings 2 and 3, in which event the center half-ring 4 will rest directly upon the bearing body 1. Only the shock-absorbing plates 7 and the half-rims 8 and 9 are then modified accordingly. The plates 7 are then provided either with a recess in the lower part for passage of the center half ring 4 of the elastic support, or made up of two packs arranged on opposite sides respectively of the half-ring 4.

I claim:

1. In a shock-absorbing bearing structure for a rotatable shaft enabling said shaft to be rotated in excess of a critical speed, and to also damp vibration incurred at any speed, the combination comprising a bearing support body, a bush surrounding said shaft, an elastic bush spring comprised of at least three half-ring means united by elastic bars, said bush resting directly upon and being supported by at least one of said half-ring means and the entire weight of said shaft being transmitted from said bush supporting half-ring means through a flexure of said elastic bars to the remaining half-ring means which rest directly upon said bearing support body, and a vibration damping element comprising a cylindrical pack of thin plates inserted between said bearing support body and said bush supporting half ring means, said pack of plates being free from any stress imposed solely by the weight of said shaft and serving only to absorb and damp shaft vibrations.

2. A shock-absorbing shaft bearing structure as defined in claim 1 wherein the two outermost of said three half-ring means rest directly upon said bearing support body adjacent opposite ends of said cylindrical plate pack and the intermediate half-ring means serves to bear downwardly against said cylindrical plate pack to damp shaft vibrations.

3. A shock-absorbing shaft bearing structure as defined in claim 1 and which further includes a first lower arcuate half-rim located intermediate said bush supporting half-ring means and said cylindrical pack of plates, and a second upper arcuate half rim located intermediate said cylindrical pack of plates and said bush, said half-rims serving to effect a uniform distribution of the shaft vibrations to said plate pack.

4. A shock-absorbing shaft bearing structure as defined in claim 3 wherein said bush is provided with axially spaced collars and said upper arcuate half-rim is provided with an inwardly directed rib seated between said spaced collars.

References Cited

UNITED STATES PATENTS

| 3,055,083 | 9/1962 | Stobi | 308—15 |
| 3,101,979 | 8/1963 | Mard | 308—26 |

FOREIGN PATENTS

| 578,989 | 7/1946 | Great Britain. |
| 921,720 | 3/1963 | Great Britain. |

MARTIN P. SCHWADRON, *Primary Examiner.*

DAVID J. WILLIAMOWSKY, FRANK SUSKO, *Examiners.*

N. ABRAMS, R. F. HESS, *Assistant Examiners.*